(12) United States Patent
Rubano

(10) Patent No.: US 6,908,252 B1
(45) Date of Patent: Jun. 21, 2005

(54) INTEGRATED JOINT ASSEMBLY FASTENER

(75) Inventor: Patrick Rubano, Montreal (CA)

(73) Assignee: 154322 Canada Inc., Montreal (CA)

( * ) Notice: Subject to any disclaimer, the term of this patent is extended or adjusted under 35 U.S.C. 154(b) by 53 days.

(21) Appl. No.: 10/399,774

(22) PCT Filed: Oct. 25, 2000

(86) PCT No.: PCT/CA00/01275

§ 371 (c)(1),
(2), (4) Date: Apr. 25, 2003

(87) PCT Pub. No.: WO02/35102

PCT Pub. Date: May 2, 2002

(51) Int. Cl.$^7$ .............................................. F16B 12/23
(52) U.S. Cl. .............. 403/231; 403/368; 403/DIG. 11; 403/DIG. 12; 403/DIG. 13; 411/54
(58) Field of Search .............................. 403/231, 409.1, 403/DIG. 8, DIG. 11–DIG. 13, 367, 368, 403/371, 374.1; 411/54, 60.3, 57.1

(56) References Cited

U.S. PATENT DOCUMENTS

| | | | | |
|---|---|---|---|---|
| 4,664,548 A | * | 5/1987 | Brinkmann | .................. 403/14 |
| 4,693,630 A | | 9/1987 | Giovannetti | |
| 4,938,625 A | * | 7/1990 | Matsui | ....................... 403/231 |
| 5,567,081 A | | 10/1996 | Vallance | |
| 5,613,796 A | * | 3/1997 | Salice | ..................... 403/409.1 |
| 5,772,353 A | * | 6/1998 | Grieser et al. | ............... 403/231 |
| 6,148,569 A | * | 11/2000 | Giovannetti | ............. 52/127.11 |
| 6,547,477 B1 | * | 4/2003 | Huber et al. | ............. 403/322.4 |

FOREIGN PATENT DOCUMENTS

| | | |
|---|---|---|
| DE | 15 46 526 A | 4/1977 |
| EP | 1 008 767 A | 6/2000 |

* cited by examiner

*Primary Examiner*—Flemming Saether
(74) *Attorney, Agent, or Firm*—Ogilvy Renault; Guy J. Houle

(57) ABSTRACT

An integrated joint assembly fastener is described for removably securing two adjoining members together along flat mating surfaces. A housing is provided with an off-center circular bore in which a rotatable element is held captive. The bottom end of the rotatable element has an offset connecting post which extends perpendicular to a slit provided in a rear sidewall of the housing. Stationary wedges on the housing front project from opposite side of the slit. A pair of connecting dowel head sections project from the front opening and are engaged by the offset connecting post of the rotatable element. The dowel head sections have a gripping ridge section at a free end and an inclined abutment formation for sliding engagement against the wedges. By rotating the rotatable element, the gripping ridge sections of the dowel head are pulled back and wedged outwardly, laterally. Displacement inwardly towards the housing front causes each gripping head section to engage within the materials in bore of the adjoining member and to pull back and tighten the members together.

20 Claims, 5 Drawing Sheets

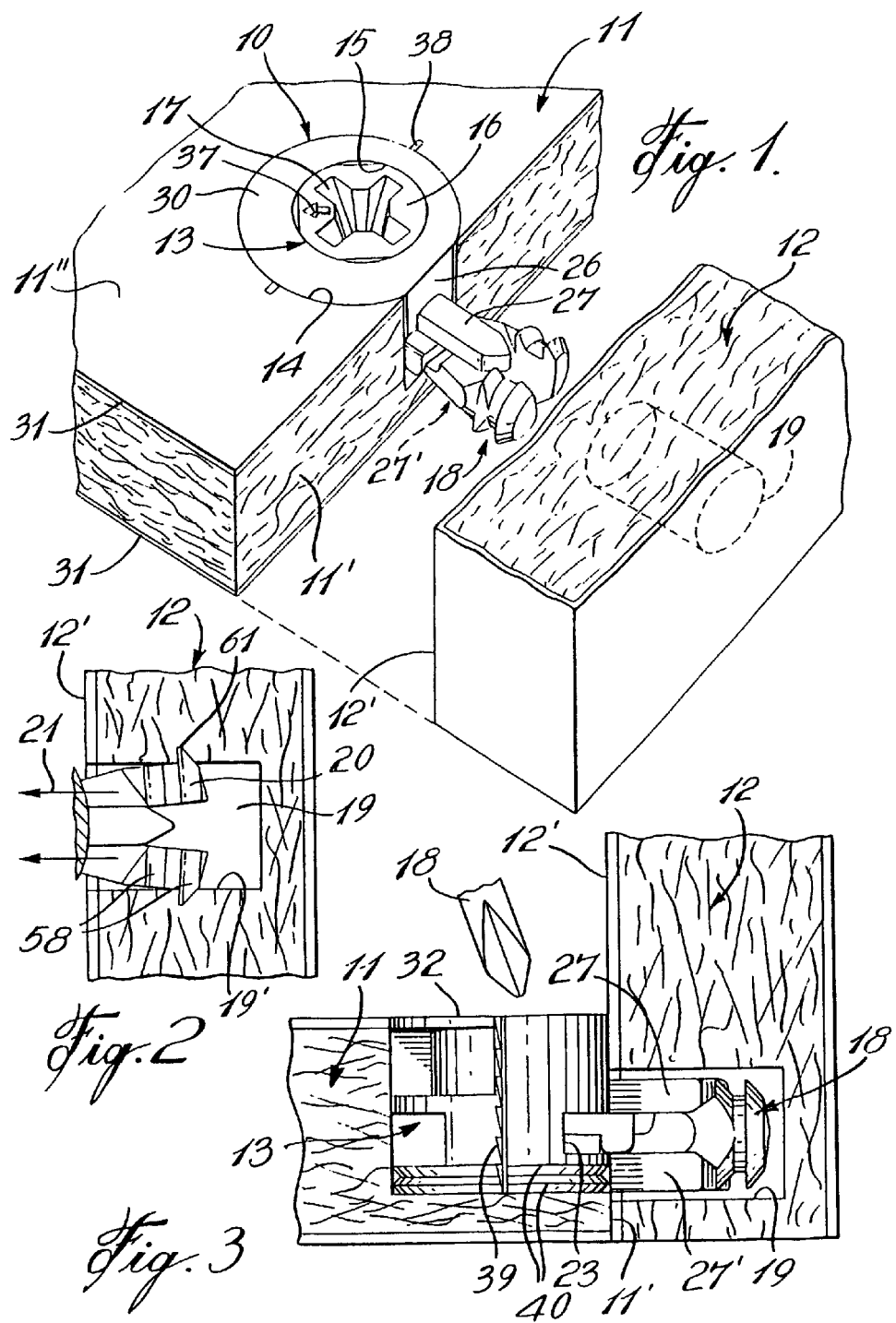

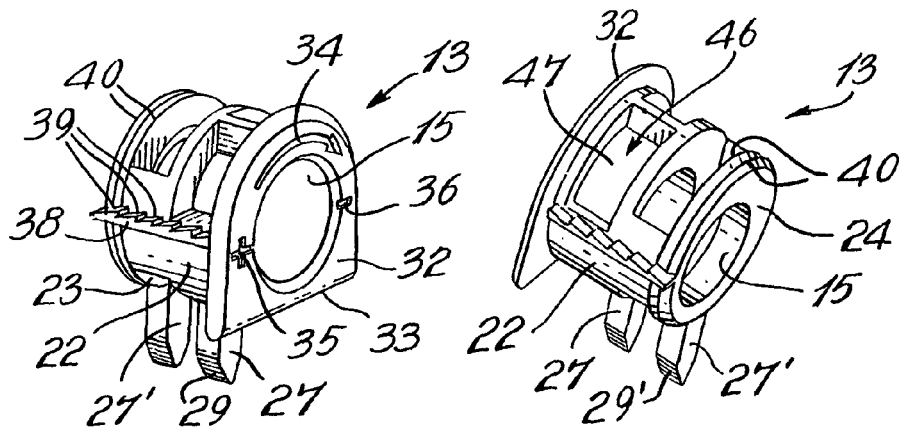
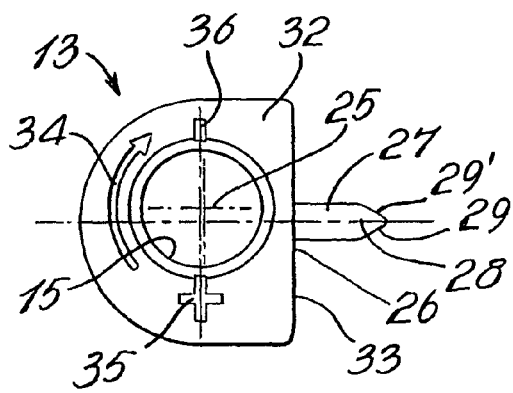 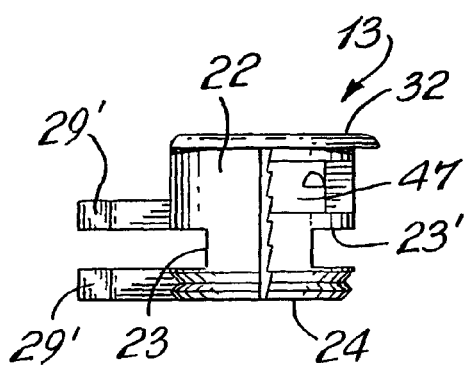
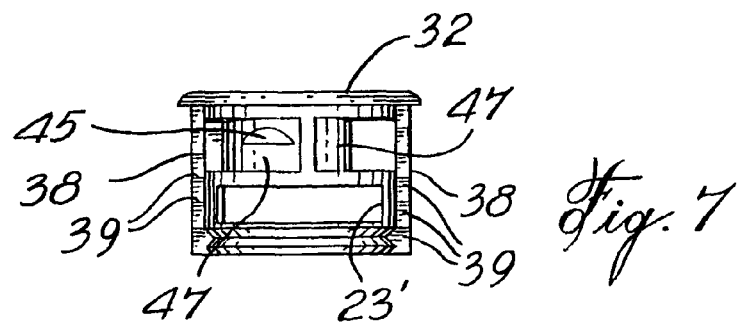

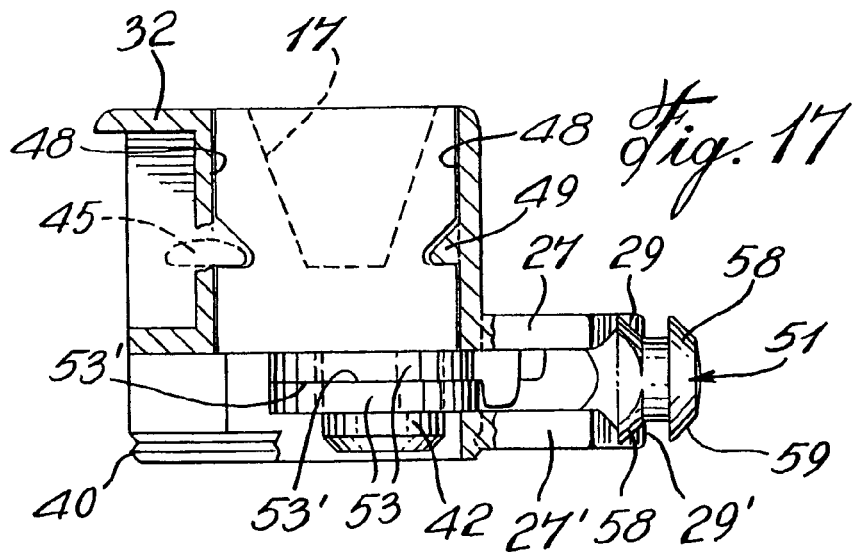
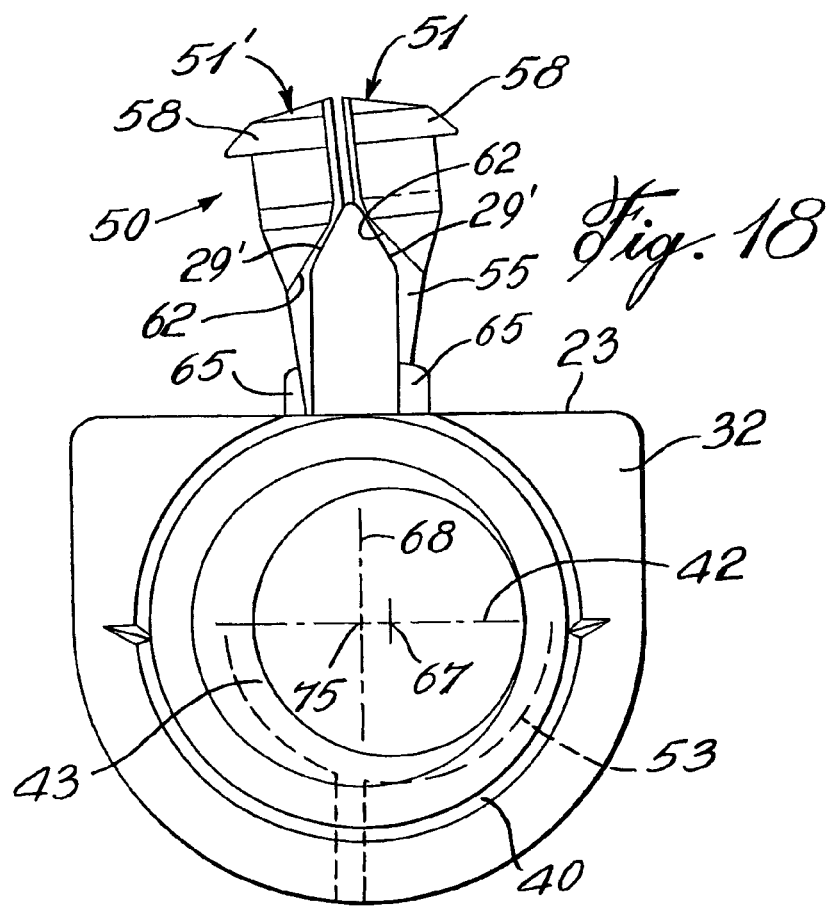

INTEGRATED JOINT ASSEMBLY FASTENER

FIELD OF THE INVENTION

The present invention relates to an integrated joint assembly fastener for immovably securing two adjoining parts together along mating surfaces thereof. More particular, but not exclusively, the fastener assembly of the present invention is for use in fastening flat furniture board pieces together whereby an article of furniture can be quickly and securely assembled and relatively easy to disassemble, if required.

BACKGROUND OF THE INVENTION

Fastening devices of the type disclosed in the present application are exemplified, for example, by U.S. Pat. No. 4,693,630 and German Patent 2 546,526. In the U.S. patent there is described a fastening device for releasable interconnection of panels and wherein a pair of resilient projecting clamping arms extend out of a cylindrical housing mounted adjacent a straight edge of one panel whereby to be received in a bore formed in an adjacent panel to be connected thereto. The clamping arms form part of a resilient unitary spring member with the arms being separated to an engaged position by rotating a cam to force them against a wedge. Accordingly, the clamping arms expand and grip into the sidewalls of the bore. When it is necessary to release the clamping arms from the bore one has to rely on the restoring force of the spring element. A disadvantage of this type of a fastening device is that due to metal fatigue and due to the force of engagement of the spring, it may be difficult to release the clamping arms from the sidewall of the bore when one needs to disassemble the panels. The disassembly usually results in damaging the inner sidewall of the bore and accordingly it is no longer possible to reengage the clamping arms to reconnect the panels and the entire piece of furniture that is formed by these panels can no longer be assembled with the fastening devices. Furthermore, the manufacturing of such a fastener is expensive due to machining and assembly. It can also be said that it is unreliable.

German Patent 2 546 526 teaches a similar type connector and wherein a split dowel head with gripping head sections project from the housing and is actuated to a gripping position by driving a wedge therebetween. Various types of mechanisms are disclosed for actuating the wedge to cause the gripping head to open. Again, the problem with this type of connector is that it poses difficulty in disengaging the head if adjoining panels need to be disconnected. The problem of damaging the sidewalls of the bore in attempting to disconnect the members also poses another serious problem, as above described.

SUMMARY OF THE INVENTION

It is a feature of the present invention to provide a fastener assembly for releasably securing two adjoining parts together along flat mating surfaces and which substantially overcomes the above-mentioned disadvantages of the prior art.

Another feature of the present invention is to provide a fastener assembly of the above type which uses die-cast parts, which are easy to assemble, easy to actuate and which can be positively disengaged prior to the withdrawal of the dowel head from the connecting hole.

Another feature of the present invention is to provide a joint fastener of the above type which is capable of releasably securing two adjoining parts under tension to provide a rigid securement of the parts in flat facial relationship.

Another feature of the present invention is to provide a fastener assembly of the above type and wherein the rotatable, screw-like element, provides a wedging action when the dowel head is subjected to tension caused by a turning force applied against the interconnected parts.

According to the above features, from a broad aspect, the present provides a fastener assembly for releasably securing two adjoining parts along flat mating surfaces thereof. The fastener assembly comprises a housing having an off-center bore, of circular cross-section, extending from a top wall of the housing. An opening is provided in a rear sidewall of the housing leading to the bore. A rotatable element having a circular sidewall is disposed in close rotational fit in the bore. Means is provided to maintain said rotatable element in said bore. An offset connecting post projects from a lower end of the rotatable element and disposed adjacent the opening when the rotatable element is in the bore. Stationary wedge means project from the front sidewall at a predetermined location adjacent the opening. The fastener assembly is characterized in that a pair of connecting dowel head sections project from the opening and have an engageable end for attachment with the offset connecting post. The dowel head sections have a gripping head section at a free end thereof and an inclined abutment formation for sliding engagement against the wedge means when the dowel head sections are axially displaced by the offset connecting post when the rotatable element is rotated in a predetermined direction to retract the dowel head sections to cause their inclined formations to be displaced against the wedge means and urging the respective gripping head sections outwardly laterally to an engaging position. When the gripping head sections are engaged, and the rotatable element is rotated in opposite direction, it forces the gripping head sections to move forward to a loose disengaged position thereby disconnecting the two adjoining parts from the sidewall of the hole.

BRIEF DESCRIPTION OF THE DRAWINGS

The preferred embodiments of the present invention will now be described with reference to the accompanying drawings in which FIG. 1 is a fragmented perspective view showing the fastener assembly of the present invention secured within a flat edge of a board piece whereby to secure an adjacent board piece along the edge by means of a connecting dowel engageable in a hole formed in a flat wall of the adjoining board piece;

FIG. 2 is an enlarged side view showing the gripping head sections of the dowel head engaged in the dowel head hole of the adjacent part;

FIG. 3 is a fragmented view showing the position of the board pieces prior to being interconnected together along flat mating surfaces and by the use of a tool for rotating a rotatable element which causes engagement of the dowel head;

FIG. 4A is a perspective view showing the construction of the housing;

FIG. 4b is a different perspective view showing the construction of the housing;

FIG. 5 is a top view of the housing;

FIG. 6 is a side view of the housing;

FIG. 7 is a further rear side view of the housing;

FIG. 17 is a fragmented partly sectional side view showing the fastener assembly in an assembled condition; and FIG. 18 is a bottom view of the fastener assembly showing the dowel head sections with their engageable end being retracted by the offset connecting post and the position of the gripping head sections as the rotatable element is rotated towards its engaging position.

DESCRIPTION OF PREFERRED EMBODIMENTS

Figure 8:
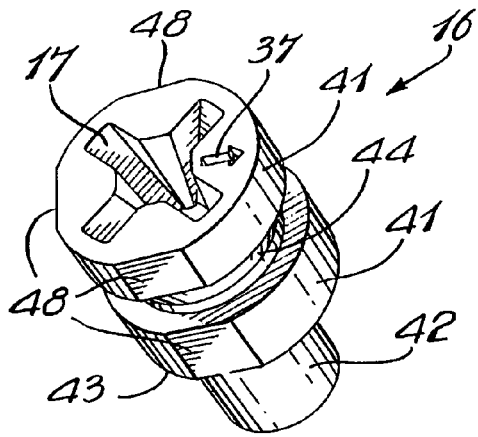
FIG. 8 is a perspective top view of the rotatable element.
Figure 9:
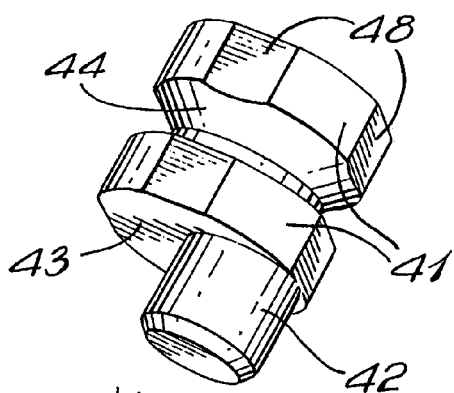
FIG. 9 is a further side perspective view of the rotatable element.

Referring now to the drawings and more particularly to FIG. 1 there is shown generally at 10 the fastener assembly of the present invention for releasably securing two adjoining parts, herein a flat panel 11 and a transverse vertical panel 12 together along flat mating surfaces 11' and 12'. The fastener assembly comprises a housing 13 which is press-fitted within a bore 14 adjacent the flat edge 11' of the bore.

The housing 13 has a bore 15 of circular cross-section for receiving in close rotational fit therein a rotatable element 16. The rotatable element 16 is provided on its top face 37 with tool engaging means in the form of a Phillips head cavity 17 whereby to be rotated by a screw driver 18, as shown in FIG. 3. Rotation of the rotatable element along a predetermined direction causes a dowel head assembly 18 to engage within the dowel head hole 19 formed in the inner flat wall 12' of the adjoining part 12 and draw the two panels together at their mating surfaces whereby to secure the two parts together.

Referring now to FIGS. 2 and 3, it can be seen that in order to secure the two parts together their flat mating surfaces 11' and 12' are positioned one adjacent to the other with the dowel head assembly 18 being positioned within the dowel head hole 19. By inserting the screw driver head 18 into the cavity 17 of the rotatable element, the element is rotated and the gripping head sections 20, one only being shown in FIG. 3, are caused to engage within the inner sidewall 19' of the dowel head hole 19 while at the same time applying a pulling force in the direction of arrow 21 to hold the connected part under tension, as will be described in detail later on.

With reference now to FIGS. 4A to 7 there will be described the construction of the housing 13. As hereinshown the housing as a circular sidewall 22 and an opening, in the form of a rectangular transverse slot 23 is formed adjacent a bottom end 24 of the housing. The bore 15 is hereinshown as a through bore but this is not essential as the bottom end 24 of the bore could have a solid wall. Also, the slot 23 is shown as being formed on opposed diametrical sides of the circular sidewall 22, as depicted by reference numeral 23', and this is also not essential but it is essential that the slot 23 be disposed transverse to the central longitudinal axis 25 and extend on opposed sides of a flat outer wall section 26 formed within the circular sidewall 22 of the housing and for positioning in the plane of the flat mating surface 11' of the part 11 in which the housing is secured.

Stationary wedge means in the form of a pair of wedge arms 27 and 27' extend respectively from opposed sides of the slot 23, as shown in FIG. 6, and project in alignment parallel to one another in a common plane on an axis 28 which is offset from the central longitudinal axis 25 of the through bore 15, as illustrated in FIG. 5. The reason for this will be described later. Each wedge arm 27 and 27' has a wedge shaped free end 29 and is of a predetermined length.

As can be seen in FIG. 1 the housing may have a flat top wall 30. When boring a hole in wood this could cause chipping in the veneer surface 31 about the bore. In order to conceal any of this chipping it is preferable that a flat transverse flange 32 extend about the bore 15. The flange is provided with a straight edge 33 coextending with the flat outer wall 26 as better seen in FIG. 5. Indicator means in the form of an arrow symbol 34 is stamped in the top wall of the flange 32 to indicate the direction of rotation of the rotatable element to place the dowel head assembly 18 in an engaged position. The flange 32 is also provided with a symbol 35 on one side of the bore 15 and a further symbol 36 on the other side. The rotatable element 16 is also provided with a position indicator mark 37, as shown in FIG. 1, on a top face thereof whereby when this position indicator mark is adjacent the symbol 35 it indicates that the dowel head assembly is not engaged. When the indicator mark is closer to the mark 36 this indicates that the bolt is engaged. To engage the dowel head assembly, the rotatable element 16 is rotated along an arc of approximately 120° to 160° and this distance of rotation depends on the dowel head hole diameter and the type of material the dowel head is engaged into. If the material is hard, it requires less rotation to engage the dowel head.

The housing 13 is further provided with opposed projecting axial ribs 38 to prevent rotation of the housing 13 when force fitted in the locating bore 14 formed in the surface 11" and to increase the pulling force and surface against the member 11. As shown in FIG. 1 this locating bore 14 extends partly into the flat side edge 11' whereby the flat outer wall section 26 of the housing lies flush with the flat side edge 11' with the wedge arms 27 and 27' and dowel head assembly 18 projecting therefrom.

A plurality of gripping ribs 39 are also disposed along the axial ribs 38 which are formed on opposed sides of the sidewall on a transverse diametrical axis of the housing bore 15. These gripping ribs 39 resist against an outward and upward pulling force exerted on the housing when forces are applied against the adjacent board or part 12 tending to push the housing upwards. Furthermore, a lower outer circumferential wall section of the housing is provided with one or more circumferential wedge formations 40 to again resist against this outward pulling force which may be exerted on the housing.

Figure 11:
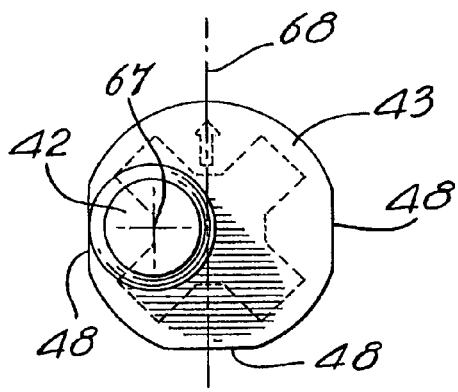
FIG. 11 is a bottom view of the rotatable element.
Figure 10:
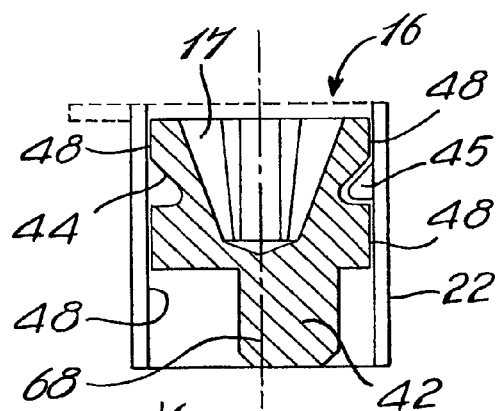
FIG. 10 is a cross-section view of the rotatable element.
Figures 12A, 12B:
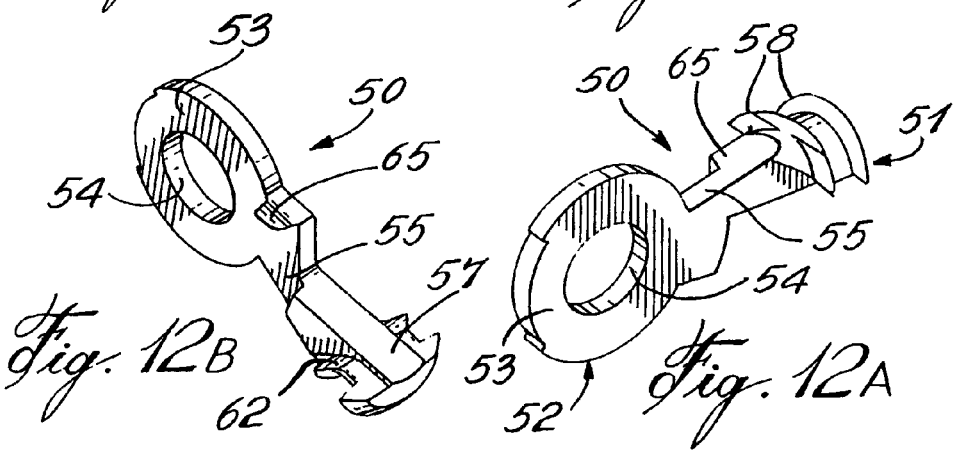
FIG. 12A is a perspective view as viewed from an outer side of a dowel head sections.
FIG. 12B is a perspective view, as viewed from an inside of the dowel head section.
Figure 13:
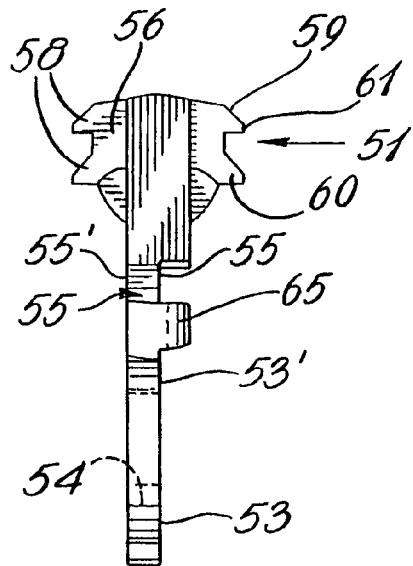
FIG. 13 is an outside side view of the dowel head section.
Figure 14:
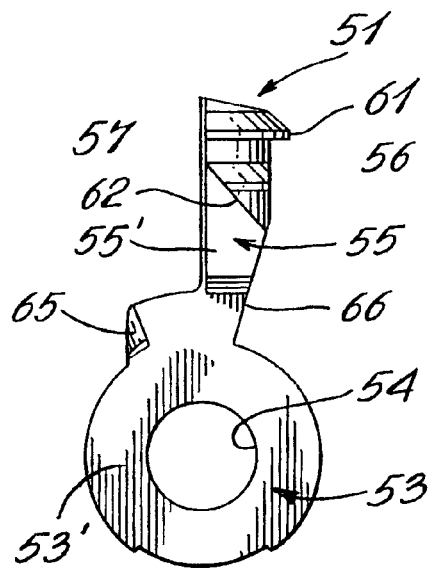
FIG. 14 is a top view of the dowel head section as viewed from the inside surface.
Figure 15:
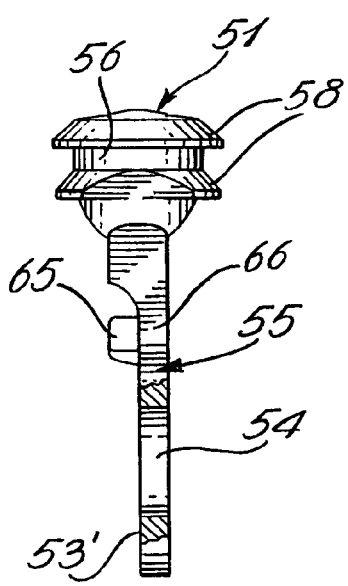
FIG. 15 is an outside view of the dowel head section opposite to FIG. 13.
Figure 16:
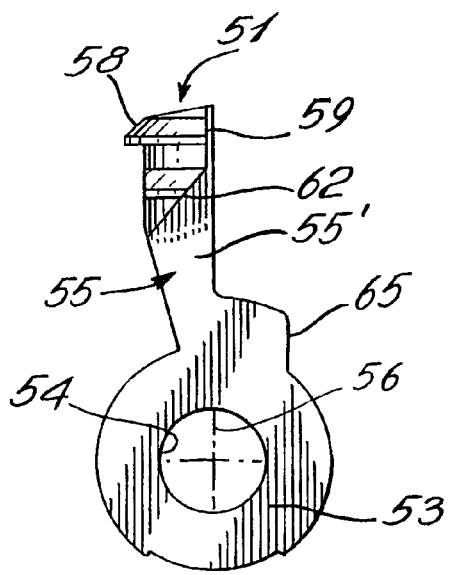
FIG. 16 is an underside view of a dowel head section as viewed from the outside surface.

With reference now to FIGS. 8 10 11 there will be described the construction of the rotatable element 16. As hereinshown the rotatable element has a circular sidewall 41 for close rotational fit in the bore 15 of the housing 13. An offset connecting post 42 projects form a lower end 43 of the rotatable element and when fitted into the bore 15 this offset connecting post 42 is disposed adjacent the rectangular slot 23. The circumferential sidewall 41 is further provided with a circumferential channel 44 whereby to retain the rotatable element captive in the housing 13, at a predetermined position, by a rib 45 which is punched into a thin sidewall portion 46 of the housing as shown in FIGS. 7 and 4B. This assembly can be done automatically on a jig and the rib is punched from the outside surface 47 of the insidewall portion 46 as shown in FIG. 4B.

As can be seen from FIG. 10 the tool engaging formation 17, herein a Phillips cavity is substantially large whereby a screw driver head 18, as shown in FIG. 2, can engage the rotatable element from an angle thereof due to the fact that the housing is secured in a corner of adjoining interconnected pieces, such as pieces 11 and 12 as illustrated in FIG. 2. Of course, the tool engaging formation 17 can have any shape to engage any type of special tool. It could also be an Alan key engaging formation which could be of smaller size as such keys can easily access tight areas from above.

The rotation element 16 is further provided with wedging flat sidewall sections 48 which are provided in a circular sidewall and disposed at 90° interval form the position indicator mark 37 to further provide improved wedging of the rotational element 16 when the screw is rotated to a dowel head engaged position. The tension exerted on the bolt, in the direction of arrow 21, as shown in FIG. 3, would be resisted by these wedging flat sidewall sections 48 which are in close fit against the inner sidewall 49 of the bore 15 as illustrated in FIG. 17. The wedging flat sidewall sections prevent the rotatable element from disengaging or unscrewing due to tension or vibration. The material surrounding the dowel head hole will destroy before the rotatable element unscrews from its locked position.

With reference now to FIGS. 12A to 16 there will be described the construction of the dowel head assembly 18. The dowel head assembly is comprised of a pair of connecting dowel head sections 50, one of these sections being clearly illustrated by FIGS. 12A to 16. As hereinshown the dowel head sections 50 have a gripping head 51 at a free end thereof and an engageable end 52 at an opposed end. The dowel head section 50 is a cast section and the engageable end 52 is constituted by a flat ring formation 53 having a through bore 54 for engagement about the offset connecting post 42 of the rotatable element 16. The flat ring formation merges into the gripping head 51 via a flat connecting body portion 55.

As better seen in FIGS. 13 to 16 the gripping head 51 is of substantially semi-circular cross-section and defines an arcuate outer wall 56 and a flat inner wall 57. The head is provided with gripping ribs 58 in the arcuate outer wall 56. The ribs 58 have a rearwardly sloped front wall 59 and a flat rear wall 60 whereby to define a sharp pointed outer gripping edge 61 to penetrate the sidewall of the bore 19.

An inclined abutment formation is defined by a sloped inner wall portion 62 disposed in a base of the head and extending to the flat inner wall 57 of the head section. The sloped inner wall position 62 extends on both sides of the outer surfaces 55' of the body position 55 and is adapted to lie on the sloped walls 29' of the wedge shaped free end 29 of the wedge arms 27 when two of these dowel head sections 50 are interconnected together about the offset connecting post 42 and project out of the rectangular slot 23 formed in the sidewall of the housing with the gripping head sections 51 located on a respective side of the wedge arms 27 and 27' as more clearly illustrated in FIG. 18. As shown in FIG. 18 the gripping head may be provided with one or two gripping ribs 58. Also, the ribs 58 may have different sizes depending on their intended use which is particularly dictated by the hardness of the material that the connecting parts are formed of.

The gripping head 51 of each pair of connecting dowel head sections 50 is disposed on a respective side of a central longitudinal axis 56 of the dowel head sections 50 whereby the flat ring formations 53 of each dowel head section 50 of a pair of dowel head sections can be disposed in facial contact on a contact face 53' thereof, see FIG. 17. The flat ring formations 53 are disposed about the offset connecting post 42 with the gripping head sections 51 lying on a respective side of the wedge arms 27 as clearly illustrated in FIG. 18.

Each of the flat connecting body portions 55 are provided with an abutment flange 65 projecting outwardly from an edge and extending above the contact face 53' at a predetermined position to arrest an edge, herein edge 66 of the other flat connecting body when the pair of flat connecting body are disposed in facial contact whereby to restrict the angular outer displacement of the gripping head sections 51 and the rotation of the rotatable element 16 or the displacement of the connecting post 42 away from the transverse slot 23 when rotated in the direction of arrow symbol 34. As shown in FIG. 18 which is a bottom view of the housing, when the offset connecting post 42 is displaced away from the slot 23 it will exert a pulling force on the flat ring formations 53 thereby drawing the gripping head sections 51 and 51' against the stationary wedge arms 27 and 27'. Because the offset post is rotated in one direction which is offset from the central rotational axis 75 of the rotational element 16, the head formations 51 will be angulated, as hereinshown, with gripping head 51' being pulled further in then gripping head 51 as its flat ring formation 53 will be acted upon by the post 42 before the ring of the other dowel head section but will straighten out as the center axis 67 of the offset connecting post 42 comes closer to the plane 68 of the central axis 75 of the rotatable element 16.

As the rotatable element 16 is rotated and retracts the gripping head sections 51 and 51', the sloped inner wall portions 62 of the gripping head sections cause the gripping heads 51 to separate and move outwardly of one another due to their sliding engagement with the slope walls 29' of the stationary wedge arms 27 and 27' thereby forcing the pointed outer gripping edge 61 of the gripping ribs 58 into the inner sidewall 19' of the dowel head hole 19, as shown in FIG. 3. The gripping ribs pull the flat mating surface 12' of the part 12 against the flat mating surface 11' of the part 11 and places the dowel head sections 50 under tension due to the pulling force exerted in the direction of arrow 21, as shown in FIG. 3. The flat wedge sections 48 of the rotatable element solidly and frictionally engage the inner sidewall of the housing bore 15 providing a wedging action to prevent the rotatable element from being rotatably displaced by the pulling force of the dowel head or by added tension caused by the application of a force against either of the adjoining connected parts 11 and 12.

Although the two adjoining parts 11 and 12 illustrated in the drawings are wooden boards, such as laminated chip or sawdust boards with laminated surfaces, it is to be understood that the fastener assembly may be utilized for fastening various types of elements together having flat mating surfaces. The boards could also be fabricated from certain plastics material. As previously described, depending on the material used the gripping ribs in the head formations may be modified to adapt to such material. In the particular embodiment described the wood pieces are flat boards which are connected at right angles against flat side edges thereof to fabricate furniture pieces. All of the parts forming the fastener assembly are zinc cast metal parts and various types of other metals or materials could be used. It is also conceivable that the fastener may be injection molded from structural plastic materials and again depending on its intended use. It is therefore within the ambit of the present invention to cover any obvious modifications of the preferred embodiment described herein, provided such modifications fall within the scope of the appended claims.

What is claimed is:

1. An integrated joint assembly fastener (10) for releasably securing two adjoining parts (11-12) together along flat mating surfaces (11'-12') thereof, said fastener assembly comprising a housing (13) having an axially off-center bore (15) of circular cross-section extending from a top wall (30) of said housing, an opening (23) offset from a side wall (22) of said housing leading to said bore, a rotatable element (16) having a circular sidewall (41) for close rotational fit in said bore (15), means (45) to maintain said rotatable element in said bore, an offset connecting post (42) projecting from a lower end (43) of said rotatable element and disposed adjacent said opening (23) when said rotatable element is in said bore, stationary wedge means (27-27') projecting from said sidewall (22) at a predetermined location adjacent said opening, characterized in that a pair of connecting dowel head sections (50) project from said opening and have an engageable end (52) for attachment about said offset connecting post (42), said dowel head sections (50) having a gripping head section (51) at a free end thereof and an inclined abutment formation (62) for sliding engagement against said wedge means (27-27') when said dowel head sections are axially displaced by said offset connecting post (42) when said rotatable element (16) is rotated in a predetermined direction (34) to retract said dowel head sections (50) to cause their inclined abutment formation to be displaced against said wedge means and urging said respective gripping head sections (51) outwardly to an engaging position; said rotatable element (16) when rotated in an opposite direction when said gripping head sections are engaged, forcing said gripping head sections to move inwardly to a disengaged position, thereby disconnecting two adjoining parts (11-12), said engageable end (52) of said connecting dowel head sections (50) being constituted by a flat ring formation (53) formed in said flat connecting body portion, said ring having a through bore (54) for loosely receiving said offset connecting post (42) therethrough said gripping head section (51) of each said pair of connecting dowel head sections (50) being disposed on a respective side of a central longitudinal axis (68) passing through said wedge means (27-27') whereby said flat ring formation (53) of each dowel head section of said pair can be disposed in facial contact on a contact face (53') about said offset connecting post (42).

2. A fastener assembly as claimed in claim 1 further characterized in that said opening (23) in a sidewall (22) of said housing (13) is a transverse slot (23) disposed transverse to a central longitudinal axis (25) of said bore.

3. A fastener assembly as claimed in claim 2 further characterized in that said stationary wedge means (27-27') is constituted by a pair of like wedge arms (27-27') extending from a flat outer wall section (26) of said housing, each wedge arm being disposed on a respective one of opposed sides of said transverse slot (23) and project aligned parallel to one another in a common plane (28), passing through said central longitudinal axis each wedge arm (27-27') having a wedge shaped free end (29), said wedge arms having a predetermined length.

4. A fastener assembly as claimed in claim 3 further characterized in that said gripping head section (51) of said dowel head sections (50) is of substantially semi-circular cross-section defining an arcuate outer wall (56) and a flat inner wall (57), said head section having gripping ribs (58) in said arcuate outer wall, said gripping ribs having a rearwardly sloped front wall (59) and a flat rear wall (60) to define a sharp pointed outer gripping edge (61), said inclined abutment formation (62) being constituted by a sloped inner wall portion disposed in a bore of said head and extending to said flat inner wall of said head section and adapted to lie on a sloped wall (29') of at least one of said wedge shaped free end (29) of said wedge arms (27-27').

5. A fastener assembly as claimed in claim 4 further characterized in that said wedge shaped free end (29) has opposed sloped walls (29'), said gripping head section (51) having a pair of said sloped inner wall portions (62) disposed on each side of a flat connecting body (55) of said connecting dowel head sections (50), each said sloped inner wall portions (62) being disposed against a common one of said opposed sloped walls (29') of a respective one of said wedge arms (27-27').

6. A fastener assembly as claimed in claim 3 in combination with said two adjoining parts (11-12) and further characterized in that said parts are flat rectangular wood pieces, one of said wood pieces (11) having one or more of said locating bores (14) therein, the other of said adjoining wood piece (12) having one or more dowel head holes (19) therein disposed in a sidewall (12') thereof adjacent a straight edge and aligned to receive respectively said wedge arms (27-27') and dowel head section (50) when disposed at right angles against said flat side edge (12') of said one of said wood pieces, said rotatable element (16) when rotated to cause said head sections (51) to move outwardly forcing said gripping ribs (58) of said heads to engage into a sidewall (19') of said dowel head hole (19) and drawing said wood pieces together along said flat mating surfaces.

7. A fastener assembly as claimed in claim 6 further characterized in that said wood pieces (11-12) are pre-machined wood furniture components.

8. A fastener assembly as claimed in claim 1 further characterized in that said flat connecting bodies (55) extend through said transverse slot (23) between said pair of like wedge arms with said gripping head sections (51) on a respective side of said wedge arms(27-27').

9. A fastener assembly as claimed in claim 8 further characterized in that one of said flat connecting bodies (55) are each provided with an abutment flange (65) projecting outwardly from said contact face (53') at a predetermined position to arrest an edge of the other flat connecting body when said pair of flat connecting bodies are disposed in said facial contact whereby to restrict the angular outer displacement of said gripping head sections (51) by rotation of said rotatable element (16) and further restricting displacement of said connecting post (42) away from said transverse slot (23).

10. A fastener assembly as claimed in claim 9 further characterized in that said rotatable element (16) is provided with a tool engaging formation (17) in an outer end face (30) thereof to impart rotation to said rotatable element.

11. A fastener assembly as claimed in claim 10 further characterized in that said tool engaging formation (17) is a screw driver or key engaging formation, said formation (17) having a predetermined depth for engagement by a screw driver bit (18) or key end disposed at an angle thereto or vertical therein.

12. A fastener assembly as claimed in claim 10 further characterized in that rotation of said rotatable element (16) to dispose said connecting post (42) adjacent said transverse slot (23), and substantially in said common plane (28) of said pair of wedge arms (27-27'), positions said gripping head sections (51) to their outermost non-engaging position with said sloped inner wall portions (62) of said gripping head sections (51) lying forwardly of said wedge shaped free end (29) of said wedge arms (27-27'); said rotatable element 16 when rotated away from said common plane (28) causing displacement of said connecting post (42) along an offset arc to said central rotational axis (25) of said rotatable element (16) and away from said transverse slot (23) thereby pulling said head sections (51) and causing them to move outwardly of one another to an engaging position due to the sliding engagement of said sloped inner wall portions (62) against respective sloped walls (29') of said wedge shaped free end (29) of said pair of wedge arms (27-27').

13. A fastener assembly as claimed in claim 12 further characterized in that said top wall (30) of said housing (13) has a flat transverse flange (32) disposed about said bore (15), said transverse flange having a straight edge (33) coextending with said flat outer wall section (26) of said housing, and indication means (34) in an outer surface of said flange (32) to indicate the direction of rotation of said rotatable element (16) to place said gripping head sections (51) at said engaging or disengaging positions.

14. A fastener assembly as claimed in claim 13 further characterized in that said outer end face of said rotatable element (16) is further provided with a position indicator mark (37), said indicating means having a head engaging position symbol (35) and a head disengaging position symbol (36), said position indicator mark (37) being disposed adjacent said head disengaging position symbol and displaceable by rotation of said rotatable element to said head engaging position indicator mark to place said gripping head sections (51) in an engaging position and vice versa to disengage said gripping head sections, said head engaging and disengaging symbols (35-36) being disposed on a diametrical axis of said bore (15) and extending substantially parallel to the plane of said flat outer wall section (26) of said housing (13).

15. A fastener assembly as claimed in claim 14 further characterized in that said rotational element (16) circular sidewall (44) is provided with 3 (three) wedging flat sidewall sections (48), said flat sidewall sections (48) being provided at intervals of 90 degrees about said sidewall from said position indicator mark (37).

16. A fastener assembly as claimed in claim 12 further characterized in that said housing (13) is further provided with projecting axial ribs (38) to prevent rotation and increase mating surface pressure points of said housing (13) when force fitted in a locating bore (14) formed in a surface of one of said adjoining parts (11) adjacent a flat side edge (11') thereof, said locating bore (14) extending partly into said flat side edge (11') whereby said flat outer wall section (26) of said housing (13) will lie flush with said flat side edge(11') with said wedge arms (27-27') and dowel head sections (50) projecting therefrom.

17. A fastener assembly as claimed in claim 16 further characterized in that a lower outer circumferential wall section of said housing is provided with one or more circumferential wedge formations (40) to resist against an outward and upward pulling force exerted on said housing (13) when engaged in said locating bore (14).

18. A fastener assembly as claimed in claim 16 further characterized in that a plurality of gripping ribs (39) extend along said axial ribs (38), therebeing two of said axial ribs (38) disposed on opposed sides of said sidewall (22) on an axis transverse to said wedge arms, said gripping ribs (39) resisting against an outward and upward pulling force exerted on said housing.

19. A fastener assembly as claimed in claim 1 further characterized in that said fastener assembly (10) is constructed of die-cast metal parts.

20. A fastener assembly as claimed in claim 1 further characterized in that said rotatable element (16) circular sidewall (41) having a circumferential channel (44), said rotatable element (16) when disposed in said housing (13) being retained therein at a predetermined position by a rib (45) punched into said sidewall (46-47) and extending into said circumferential channel (44), said rib (45) constituting said means to maintain said rotatable element in said bore.

* * * * *